April 10, 1928.
R. O. DURST
AIR BRAKE RELEASE VALVE
Filed June 17, 1926
1,665,913
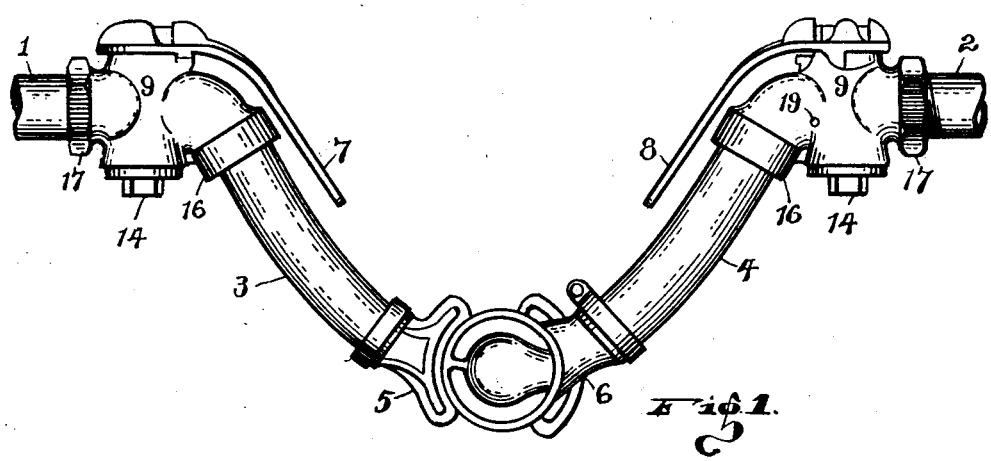
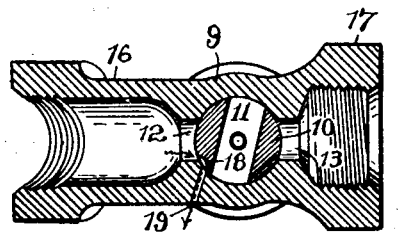
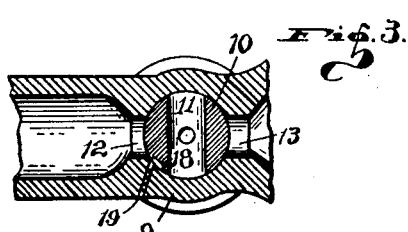
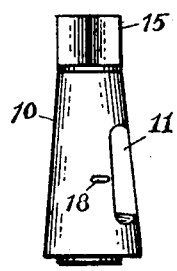
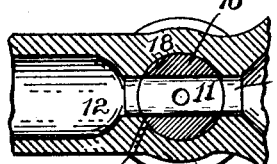
Inventor:
Ray O. Durst,
By Robert W. Candle,
Attorney.

Patented Apr. 10, 1928.

1,665,913

UNITED STATES PATENT OFFICE.

RAY O. DURST, OF RICHMOND, INDIANA.

AIR-BRAKE-RELEASE VALVE.

Application filed June 17, 1926. Serial No. 116,617.

My invention relates to improvements in the air-line of air brakes of railway trains, in which it is customary to maintain an air pressure of approximately seventy to ninety pounds, to maintain the brakes in open or inoperative position. The pressure thus normally maintained extends throughout the air-line system, including the flexible hose and the fittings at the ends of each car; therefore to uncouple the two adjoining hose from each other is sometimes a difficult and dangerous proceeding and is frequently expensive, and causes delays in the operation of trains. The reasons for such difficulty, danger, expense and delays, is this: That although the air is first shut off on each side of the coupling in the hose there still remains in the hose and the coupling substantially the same normal air pressure. Now if the air pressure in the hose could be released without disturbing the pressure in the remainder of the air line, on each side thereof, it is evident that the hose could be uncoupled with ease, and without any of the difficulties incident thereto above enumerated. Therefore the primal object of my invention is to provide means for accomplishing this result, and that without material expense or changes from the established type of valves or hose coupling, or other parts now in use. Other minor objects and particular advantages of my invention will be apparent from the following specification and the drawings forming a part thereof.

One manner of carrying out the principles of my invention and that which in practice appears to be the most practical, is shown in the accompanying drawings, in which—

Figure 1 is a side elevation of an air conducting means, such as is usually located between two cars of a railway train, showing the two valves, or angle cocks, the two hose sections, and the hose coupling, also showing a portion of each section of air pipe located under their respective cars. Figure 2 is a horizontal section of either one of the valves, showing the core turned to shut off passage of air through the valve, but such as to permit the escape of pressure of air from between the two valves, that is from the angular portion of the valve. Figure 3 is a section similar to Fig. 2, but showing the core turned not only to shut off the air pressure through the valve but also preventing the escape of pressure from both ends of the valve. Figure 4 is a section similar to that of Figs. 2 and 3, but showing the core turned to permit full pressure or passage of air through the valve. Figure 5 is a top plan view of one of the valves, showing the handle turned to place the core in the position in which it is shown in Fig. 4, also showing in dotted lines the position of the handle when the core is in the positions shown in Figs. 2 and 3. And Figure 6 is an elevation of the complete core alone.

Similar indices denote like parts throughout the several views. In order that the construction, the operation, and the advantages of my invention may be understood and appreciated, I will now take up a detailed description thereof, in which I will set forth the same as fully and concisely as I may.

In the drawings numerals 1 and 2 denote two sections of air pipes, the former being under one car and the other under another car which is spaced from and located end-to-end with the first car, and said cars may be coupled together in the usual manner, as by means of automatic couplers (not shown). The ends of said pipes 1 and 2 are shown, in Fig. 1, as coupled together in the usual manner by suitable flexible hose, 3 and 4, a pair of valves or angle cocks, and a two-part separable coupling comprising two members 5 and 6, which are identical with each other, whereby when the two valves are open, as in Fig. 4, compressed air may freely flow from one to the other of said pipes 1 and 2, and the same pressure be maintained through all of said parts.

Each of said valves is adapted to be opened and closed by its respective lever or handle 7 and 8, in the usual manner. The two valves required and shown in the drawings are identical with each other, therefore the duplicate parts will be denoted by the same numerals, and a description of one will answer for both.

Each of said valves comprises a body 9, the same having a taper aperture formed vertically therethrough to receive the body of the tapered core 10.

The core 10 has a vertical slot-like port 11 formed therethrough which corresponds and is adapted to register with the ports 12 and 13 in the body 9. Said core is retained in operative position by the screw cap 14. The upper end portion of the core 10 is formed with a square projection 15, which is engaged by the inner end of its handle 7 or 8, which handle operates in the usual manner.

Returning now to said ports: The port 12 opens into the interior of the angular hollow bib 16, whose outer end portion is interiorly threaded to provide means for connection therewith one end of a section of hose 3 or 4. The port 13 opens into the interior of the hexagon member 17, which is interiorly threaded to turn into connection with the threads on the ends of the pipes 1 or 2, as shown in Fig. 1. The said parts 9, 16 and 17 are all integral with each other.

Formed at one place in the periphery of the core 10, that is in the contact surface thereof, and preferably about midway of the port 11, vertically, is the elongated cavity 18, whose length is at right angles to the length of the port 11, near which it is located.

Numeral 19 denotes a vent aperture which is formed through the side of the wall of the body 9, one end thereof opening outside the valve and its other end opening into the core aperture of the body 9, and it is so located that it may register with the cavity 18 when the core 10 is turned to a certain position, as in Fig. 2.

It is now evident that by lifting upward on the handle 7 or 8, and then pressing the same laterally, that the core may be turned from the position in which it is shown in Figs. 1, 4 and 5, to the position in which it is shown in Fig. 2, or to the position in which it is shown in Fig. 3.

When the core is in the position shown in Figs. 1, 4 and 5, the valve will be fully open, that is to say, the ports 11, 12 and 13 will be in alinement with each other. When the handle is turned to the position in which it is indicated by dotted line A then the core 10 will be in the position shown in Fig. 3, where the passage will be fully closed between the ports 12 and 13. When the handle is turned to the position in which it is indicated by the dotted line B then the core will be in the position shown in Fig. 2, where the passage will still be fully closed between the ports 12 and 13, but at this time the aperture 19 will be in register with the cavity 18, and at the same time the cavity 18 will be open into the port 12, thereby permitting pressure to escape from the hose and the hose coupling, although entrance of air pressure thereto will be shut off, as both of the valves will be closed at that time.

Now in actual practice the procedure will be substantially as follows: We will assume that the air line is open, as shown in Fig. 1, that is that the passage of air is free between the pipes 1 and 2. Desiring now to uncouple the air line, one has only to first close either one of the valves, first turning the handle 7, for instance, to position A, thereby bringing the core 10 to the position in which it is shown in Fig. 3.

The next operation will be to turn the handle 8 to position B, thereby bringing the core 10 to the position shown in Fig. 2.

These two operations will entirely cut off all air pressure from both the pipes 1 and 2, and will at the same time open a passage for the escape of air pressure from between said valves, through the cavity 18 and the vent aperture 19, as indicated by the arrows in Fig. 2. As the escape of pressure from between the valves, as just stated, will be instantaneous it is evident that the valve controlled by the handle 8 can be almost instantly turned to position A from its last mentioned position.

It is evident that the pressure on the coupling being now released then the members of the coupling can be easily separated by the usual operation for such result, thereby completing the separation of the air line.

To connect up the air line again, one has only to first connect the members 5 and 6, and then turn the handles 7 and 8 to the position in which they are shown in Figs. 1 and 5, and the connection will then be complete.

As each of the two valves are provided with my invention, it is evident that it will make no difference which of them is operated first.

From the above it will be apparent that I am able to accomplish the results herein stated in a practical and efficient manner.

It is to be understood that I am not to be limited to the precise details of arrangement herein set forth, but various changes may be made without departing from the spirit of the invention, or without sacrificing any of the advantages thereof which are new and useful.

Having now fully shown and described my invention, what I claim and desire to secure by Letters Patent of the United States, is—

1. A valve including an angular body, and air line connected to one end of the body, a hose connected to the other end of the body, a tapered core rotatably mounted in the body, there being a slot formed through the core and adapted to register with ports located inside the body and on each side of the core with which said slot in the core is adapted to register with one of said ports directed toward the air line and the other port directed toward said hose, there being an elongated cavity formed in one side of the contact face of the core which cavity is located near but spaced from one of the open sides of said slot, there also being a vent aperture formed through the wall of the body where at one point in the rotation of the core said vent will be in communication with said cavity and at the same time said cavity will be in communication with said port which is in communication with said hose whereby pressure in the hose may be released through said vent without releasing the pressure in the air line.

2. A pair of valves identical with each other but oppositely directed, the outer ends of said valves being connected with an air line and their inner ends each being connected with a section of hose, means for detachably connecting the inner ends of the two sections of hose, a core rotatable in the body of each valve with a slot formed through each core adapted to register with ports in the body on each side of the respective cores; there being a cavity formed in one side of the contact face of each core which cavity is located near but spaced from one of the ends of the slot in the core, there also being a vent aperture formed through the wall of the body of each valve where at one point in the rotation of the core said vent will be in communication with its respective cavity and the cavity will be in communication with its port which is in communication with the respective hose whereby pressure in the hose may be released through the vent in either or both of the valves without releasing the pressure in air line connected with either of said valves.

In testimony whereof I have hereunto subscribed my name to this specification.

RAY O. DURST.